United States Patent [19]

Guo

[11] Patent Number: 5,646,225
[45] Date of Patent: Jul. 8, 1997

[54] WATER-REDUCIBLE RESINS FOR COATINGS AND INKS

[75] Inventor: Shao-Hua Guo, West Goshen, Pa.

[73] Assignee: ARCO Chemical Technology, L.P., Greenville, Del.

[21] Appl. No.: 645,393

[22] Filed: May 13, 1996

[51] Int. Cl.$^6$ .................................................. C08F 20/06
[52] U.S. Cl. ............................ 526/318.5; 526/332
[58] Field of Search ............................ 526/318.5, 332

[56] References Cited

U.S. PATENT DOCUMENTS

| | | | |
|---|---|---|---|
| 3,268,561 | 8/1966 | Peppel et al. | 260/348 |
| 4,618,703 | 10/1986 | Thanawalla et al. | 560/209 |
| 5,382,642 | 1/1995 | Guo | 526/333 |
| 5,385,655 | 1/1995 | Brent et al. | 204/181.1 |
| 5,429,674 | 7/1995 | Lamers et al. | 106/404 |
| 5,451,631 | 9/1995 | Guo | 524/529 |
| 5,470,893 | 11/1995 | Sinclair-Day et al. | 523/205 |
| 5,475,073 | 12/1995 | Guo | 526/333 |
| 5,480,943 | 1/1996 | Guo | 525/330.5 |

OTHER PUBLICATIONS

Swern et al., J. Am. Chem. Soc. 71 (1949) 1152.

*Primary Examiner*—Joseph L. Schofer
*Assistant Examiner*—N. Sarofim
*Attorney, Agent, or Firm*—Jonathan L. Schuchardt

[57] ABSTRACT

Water-reducible resins, neutralized resins, and derivatized resins useful for water-borne and solvent-based coatings and inks, powder coatings, and anti-corrosive coatings are disclosed. The water-reducible resins are copolymers of a vinyl aromatic monomer, a propoxylated allyl alcohol, and an acrylic acid monomer. These low-molecular-weight resins uniquely contain both hydroxyl and acid functional groups, and allow controlled curing with a variety of crosslinkers in coating systems. Coatings of the invention are useful in many applications, e.g., automotive basecoats, industrial appliance coatings, and wood finishes.

8 Claims, No Drawings

WATER-REDUCIBLE RESINS FOR COATINGS AND INKS

FIELD OF THE INVENTION

The invention relates to coating resins. In particular, the invention concerns water-reducible polymer resins derived from propoxylated allyl alcohol. The resins, which uniquely contain both hydroxyl and acid functional groups, can be cured with a variety of crosslinkers or mixtures of crosslinkers. The resins are especially valuable for water-borne and solvent-based coatings and inks.

BACKGROUND OF THE INVENTION

Water-borne coatings continue to gain importance because of their low cost and also because of increasingly demanding regulations that limit the amount of solvent (volatile organic compounds, VOCs) that may be released to the atmosphere during coating application. Solvent-based systems are still used extensively, however, because they offer excellent performance.

Generally, there are two kinds of coatings: thermoplastic and thermoset. Polymer resins used in thermoplastic water-borne coatings, such as acrylic and SBR latexes, are usually prepared by emulsion polymerization. Thermoplastic coatings often lack adequate resistance to heat, water, detergents, solvents, or weathering because they are not crosslinked.

Thermoset coatings overcome some of these problems. Thermoset coatings derive from low molecular weight polymer resins such as polyether polyols, polyester polyols, hydroxy- or carboxy-functional acrylic resins (e.g., styrene/acrylic acid copolymers), and the like. The resins are dissolved or dispersed in water, and are mixed with a crosslinking agent and other optional components such as pigments, fillers, or flow modifiers. The coating is applied as a liquid, water evaporates, and crosslinking occurs at ambient or elevated temperature to give a cured film.

Even thermoset coatings, particularly those that use ester-containing polymer resins, can suffer from poor hydrolytic stability. Thus, ester-containing resins such as those derived from polyester polyols and polymer resins that contain a high proportion of pendant ester groups have limited usefulness in water-borne coatings. Recently, we described copolymer resins of acrylates and allylic alcohols or propoxylated allyl alcohols (see U.S. Pat. Nos. 5,480,943 and 5,475,073). These resins are useful for making thermoset coatings, but are better suited to high-solids, solvent-based coating systems because of the difficulty in making these resins water reducible.

We also described copolymers of propoxylated allyl alcohols and vinyl aromatic monomers as useful coating resins (see, e.g., U.S. Pat. Nos. 5,451,631 and 5,382,642). Because they normally contain a large proportion (50–90 wt. %) of recurring units of a vinyl aromatic monomer (typically styrene), these resins give coatings with high hydrophobicity and good resistance to water, detergents, or other chemicals. Although these resins can be formulated into many applications, including polyurethanes, alkyd resins, and melamine coatings, their use is limited to high-solids or solvent-based applications because they are not water-soluble or water-dispersible.

Other hydrophobic coating resins, such as styrene/acrylic acid copolymers, also give coatings with good water and detergent resistance. Total or partial neutralization of the acid groups of these resins gives a water-soluble resin useful in water-borne coatings. A disadvantage of these resins is that their curing rate is sometimes too slow because the acid groups are not all that reactive with typical crosslinking agents such as melamine compounds. If the cure is too slow, the coating stays tacky too long. A catalyst can be added to accelerate curing. However, if the coating cures too rapidly, solvent is trapped in the coating and causes bubbling or blistering. In addition, the lack of hydroxyl functional groups in styrene/acrylic acid copolymers makes them unsuitable for use in polyurethane coatings. Ideally, a resin would exhibit the hydrophobicity advantages of the styrene/acrylic acid copolymer resins, but would also have faster, yet more controllable curing rates.

In sum, there is a need for coating resins that have high hydrophobicity because these resins offer good resistance to water, acids, and weathering. Especially needed are hydrophobic resins that are suitable for use in water-borne coatings and inks. In addition, there is a need for resins that allow faster, but more controlled curing. Preferred resins could be used with a many types of crosslinkers or mixtures of crosslinkers to provide more flexibility in formulating the coatings and inks.

SUMMARY OF THE INVENTION

The invention is a water-reducible resin. The resin comprises from about 50 to about 90 wt. % of recurring units of a vinyl aromatic monomer, from about 5 to about 50 wt. % of recurring units derived from a propoxylated allyl alcohol, and from about 1 to about 50 wt. % of recurring units derived from an acrylic acid monomer. The resin has a number average molecular weight within the range of about 500 to about 10,000, a hydroxyl number within the range of about 15 to about 250 mg KOH/g, and an acid number within the range of about 5 to about 330 mg KOH/g. The resin is useful in water-borne and solvent-based coatings and inks.

Neutralized resins suitable for use in water-borne coatings and inks are made by reacting the water-reducible resin described above with a neutralizing agent in an amount effective to convert at least some of the acid groups of the water-reducible resin to salts.

The invention includes derivatized resins made by reacting the water-reducible resin with a hydroxy- or carboxy-reactive compound. Also included are high-solids, solvent-based coatings, water-borne coatings, powder coatings, and water-borne or solvent-based inks made using resins of the invention.

Finally, the invention includes a process for making water-reducible resins that overcomes gelling problems. The key is to perform the polymerization in the presence of an amount of water effective to prevent the reaction mixture from gelling during polymerization or monomer removal.

DETAILED DESCRIPTION OF THE INVENTION

Water-reducible resins of the invention comprise recurring units of a vinyl aromatic monomer, a propoxylated allyl alcohol, and an acrylic acid monomer. The resins contain from about 50 to about 90 wt. % of recurring units derived from the vinyl aromatic monomer. Preferably, the resins contain from about 55 to about 70 wt. % of the vinyl aromatic monomer.

Vinyl aromatic monomers useful in the invention are aromatic compounds that have a —CH=CH$_2$ group attached to an aromatic ring. Suitable vinyl aromatic monomers include, for example, styrene, alkyl-substituted styrenes, halogenated styrenes, and mixtures thereof. Also suitable are α-substituted styrenes, i.e., styrenes in which the α-hydrogen is substituted with an alkyl group. Specific examples of suitable vinyl aromatic monomers include styrene, α-methylstyrene, 4-methylstyrene, 4-tert-butylstyrene, 2,6-dimethylstyrene, 3-chlorostyrene, 2,4,6-tribromostyrene, vinylnaphthalene, and the like, and mixtures thereof. A minor proportion of a di- or polyvinyl aromatic monomer such as divinylbenzene may be included, although it is preferred to use only a monovinyl aromatic monomer. Styrene is most preferred.

The water-reducible resins of the invention comprise from about 5 to about 50 wt. % of recurring units derived from a propoxylated allyl alcohol. The propoxylated allyl alcohol has the general formula:

in which A is an oxypropylene group, R is hydrogen or a $C_1$–$C_4$ alkyl group, and n, which is the average number of oxypropylene groups in the propoxylated allyl alcohol, has a value within the range of about 1 to about 2. Preferably, the resins contain from about 10 to about 40 wt. % of recurring units derived from the propoxylated allyl alcohol.

The oxypropylene groups in the propoxylated allyl alcohols have one or both of the structures —OCH($CH_3$)—$CH_2$— and —O$CH_2$—CH($CH_3$)—, which depends on the method of synthesis. Suitable propoxylated allyl alcohols are prepared by reacting allyl alcohol with up to 2 equivalents of propylene oxide in the presence of a basic catalyst as described, for example, in U.S. Pat. Nos. 3,268,561, 4,618,703, and 5,382,642, the teachings of which are incorporated herein by reference. Acid catalysis can also be used to make the propoxylated allyl alcohols (see, e.g., J. Am. Chem. Soc. 71 (1949) 1152).

Preferably, the propoxylated allyl alcohol has only 1 oxypropylene unit (propylene glycol monoallyl ether) because this allows unreacted monomer to be removed easily from the polymer product by stripping under vacuum at elevated temperature. However, at least one oxypropylene unit is needed to prevent gel formation resulting from intermolecular esterification reactions. Such gellation occurs if, for example, allyl alcohol is used instead of propoxylated allyl alcohol in the resin synthesis, apparently because esterification is favored by the more reactive primary hydroxyl groups of allyl alcohol.

The water-reducible resins of the invention also comprise from about 1 to about 50 wt. % of recurring units derived from an acrylic acid monomer. Preferred acrylic acid monomers have a —CH=CR—COOH group in which R is hydrogen or a $C_1$–$C_5$ alkyl group. Preferred acrylic acid monomers are acrylic acid and methacrylic acid. Preferably, the resins contain from about 1 to about 20 wt. % of recurring units derived from the acrylic acid monomer; most preferred are resins containing from about 5 to about 15 wt. % of recurring units derived from the acrylic acid monomer.

The water-reducible resins of the invention have number average molecular weights within the range of about 500 to about 10,000, preferably within the range of about 1000 to about 3000. The molecular weight can be controlled, for example, by adjusting the ratio of propoxylated allyl alcohol to vinyl monomers, the initiator concentration, and the reaction temperature. The resins have hydroxyl numbers within the range of about 15 to about 250 mg KOH/g, preferably from about 50 to about 200 mg KOH/g. In addition, the resins have acid numbers within the range of about 5 to about 330 mg KOH/g, preferably from about 5 to about 150 mg KOH/g.

The resins are generally made by combining and heating the vinyl aromatic monomer, propoxylated allyl alcohol, and acrylic acid monomer in the presence of water and a free-radical initiator at a temperature effective to copolymerize the monomers. Preferably, the reaction is performed at a temperature within the range of about 100° C. to about 200° C.; a more preferred range is from about 130° C. to about 170° C. The propoxylated allyl alcohol functions as a chain-transfer agent and keeps the molecular weight of the resin fairly low (less than about 10,000). Generally, it is preferred to charge all of the propoxylated allyl alcohol to be used to the reactor at the start of the polymerization, and to gradually add the vinyl aromatic monomer, acrylic acid monomer, and/or the free-radical initiator to the reaction mixture. Unreacted monomers are removed from the resin product by any suitable means, including vacuum stripping in the presence of water or steam.

The water-reducible resins have good solubility in a wide range of solvents (see Table 1 ). Because of their low molecular weights, low viscosities, and crosslinkability, the resins are valuable for formulating high-solids coatings. Acid functionality makes the resins water-reducible, and therefore useful in a wide range of aqueous coating and ink systems.

The water-reducible resins are useful in water-borne and solvent-based coatings and inks, powder coatings, and anti-corrosive coatings. The presence of both acid and hydroxyl groups in the water-reducible resins of the invention offers significant formulation advantages. First, it allows formulators to use mixtures of different types of crosslinkers. For example, a coating might include both a melamine compound (reacts with acid groups) and a polyisocyanate (reacts with hydroxyl groups) in various proportions. The formulator can "fine tune" the composition to produce the desired balance of physical and mechanical coating properties. Second, the ability to cure through both acid and hydroxyl groups provides added control over the curing profile. For example, with a melamine crosslinker and a resin containing only alcohol hydroxyl groups, the cure rate might be too rapid and result in undesirable trapping of solvent in the coating. Having both acid and alcohol groups available in the resin allows stepwise curing and better control over curing.

A key advantage of the resins is that they can be neutralized and thereby be converted to water-soluble or water-dispersible resins useful for water-borne coatings and inks, and anti-corrosive coatings. Neutralized resins are made by reacting the water-reducible resins with a neutralizing agent in an amount effective to convert at least some of the acid groups of the water-reducible resins to salts. Preferred neutralizing agents are alkali metal hydroxides, alkaline earth metal hydroxides, organic amines, and ammonia. Tertiary amines are particularly preferred. Specific examples of suitable neutralizing agents are sodium hydroxide, potassium hydroxide, magnesium hydroxide, lithium hydroxide, triethylamine, trimethylamine, diethanolamine, triethanolamine, N,N-dimethylethanolamine, n-octylamine, and the like, and mixtures thereof. Generally, at least about 50% of the acid groups present are neutralized, but an excess of the neutralizing agent may be used. The neutralized resins are combined with water and other components to make water-borne coatings.

The invention includes derivatized resins useful in water-borne and solvent-based coatings and inks, powder coatings, and anti-corrosive coatings. The derivatized resins are reaction products of a water-reducible resin and a hydroxy- or carboxy-reactive compound. Suitable hydroxy- or carboxy-reactive compounds include polyisocyanates (e.g., TDI, MDI, polymeric MDIs, isocyanate-terminated prepolymers, isophoronediisocyanate, 1,6-hexanediisocyanate, etc.), melamine compounds (e.g., hexamethoxymethyl-melamine, CYMEL 303, CYMEL 325, CYMEL 370, CYMEL 373, and CYMEL 380 melamine resins (products of Cytec), fatty acids, fatty esters, acrylic acid, methacrylic acid, multifunctional acids and anhydrides (e.g., maleic anhydride, phthalic anhydride, adipic acid, trimellitic acid), multifunctional hydroxyl compounds (e.g., glycerin, tripropylene glycol, polyether polyols, polyester polyols), diamines and polyamines (e.g., ethylene diamine, amine-terminated polyethers such as JEFFAMINE polyethers (products of Texaco) ), multifunctional epoxides (e.g., bisphenol A diglycidyl ether, and EPON resins (products of Shell Chemical)), and mixtures thereof. Because the derivatized resins typically retain some acid groups, they can be neutralized and dissolved or dispersed in water. Water-borne coatings can be made by combining the derivatized resin, water, a neutralizing agent, and a crosslinker, as is discussed below.

Water reducible resins of the invention are useful in making high-solids, solvent-based coatings. The coatings industry is constantly working to reduce the volatile organic compound (VOC) content of coating systems. One approach is to develop low-viscosity, reactive polymer intermediates, or "reactive diluents." The resins of the invention have low viscosities and reactive hydroxyl and acid functional groups. This combination of features makes the resins excellent components for high-solids, solvent-based coatings.

The high-solids solvent-based coatings of the invention comprise a water-reducible resin, an organic solvent in which the resin is soluble, and a crosslinker. The crosslinker is selected from the group consisting of polyisocyanates, melamine compounds, multifunctional acids and anhydrides, multifunctional hydroxyl compounds, diamines and polyamines, multifunctional epoxides, and mixtures thereof.

Suitable organic solvents for use in solvent-based coatings are good solvents for the water-reducible resin and also for the reaction product of the water-reducible resin and the crosslinking agent. Preferred organic solvents include alcohols, esters, ketones, glycol ether esters, glycol ethers, aromatic hydrocarbons, and mixtures thereof. Examples of suitable solvents include methanol, ethanol, ethyl acetate, n-butyl acetate, tert-butyl acetate, acetone, methyl ethyl ketone, methyl amyl ketone, methyl isobutyl ketone, propylene glycol methyl ether acetate, dipropylene glycol methyl ether acetate, propylene glycol n-butyl ether acetate, propylene glycol methyl ether, dipropylene glycol methyl ether, propylene glycol ethyl ether, propylene glycol n-propyl ether, propylene glycol n-butyl ether, ethylene glycol n-butyl ether, toluene, xylenes, mixed aromatic hydrocarbons, and the like, and mixtures thereof.

Preferred solvent-based coatings of the invention have high solids contents, preferably at least about 50 wt. % solids, with the balance being the organic solvent. More preferred solvent-based coatings of the invention contain at least about 60 wt. % solids.

The water-reducible resins of the invention are also valuable for water-borne coatings. The coatings comprise a water-reducible resin of the invention, water, a neutralizing agent, and a crosslinker. The neutralizing agent is used in an amount effective to convert at least some of the acid groups of the water-reducible resin to salts. The crosslinker is selected from the group consisting of blocked polyisocyanates, melamine compounds, multifunctional acids and anhydrides, multifunctional hydroxyl compounds, diamines and polyamines, multifunctional epoxides, and mixtures thereof. Other water-borne coatings of the invention are made by replacing the water-reducible resin with a derivatized resin prepared as described above.

Water-borne coatings of the invention preferably include from about 20 to about 50 wt. % of resin, and from about 50 to about 80 wt. % of water. A minor proportion (up to about 10 wt. %) of an organic solvent may be incorporated as an evaporation aid, film-forming agent, coalescent, or miscibilizing agent. Preferred organic solvent for use in water-borne coatings are esters, ketones, glycol ether esters, glycol ethers, alcohols, pyrrolidones, and lactones. Glycol ethers are particularly preferred.

Additives commonly used in coatings may be included in the solvent-based and water-borne coatings of the inventions. These include, for example, pigments and fillers (titanium dioxide, clays, carbon, aluminum flake), UV-stabilizers, hindered amines, crosslinking catalysts (organotin compounds, tertiary amines, organic sulfonic acids), low-profile additives, flow-control agents, defoamers, and the like.

The invention includes powder coatings which comprise the water-reducible resins and a crosslinker. Resins used in powder coatings of the invention preferably have a glass-transition temperature greater than about 35° C., and more preferably within the range of about 50° C. to about 60° C. Suitable crosslinkers are blocked polyisocyanates, melamine compounds, multifunctional acids and anhydrides, multifunctional hydroxyl compounds, diamines and polyamines, multifunctional epoxides, and mixtures thereof. The powder coatings, which are particularly useful for industrial appliance coatings, are produced by methods known in the art, as in for example, U.S. Pat. No. 5,470,893, the teachings of which are incorporated herein by reference.

Anti-corrosive coatings or primers of the invention are the reaction products of a water-reducible resin or a neutralized resin and phosphoric acid or an organophosphonic acid. Similar coatings and primers are described in U.S. Pat. No. 5,429,674, the teachings of which are incorporated herein by reference.

Water-borne inks of the invention comprise a neutralized resin as described above, water, a dye, and an organic solvent. The organic solvent, which functions as an evaporation aid, coalescent, or film-forming agent, is selected from esters, ketones, glycol ether esters, glycol ethers, alcohols, and mixtures thereof. Low molecular weight alcohols are preferred. Preferably, the ink contains from about 1 to about 50 wt. % of the neutralized resin, from about 10 to about 90 wt. % of water, and from about 1 to about 50 wt. % of the organic solvent.

Solvent-based inks of the invention comprise a water-reducible resin, a dye or pigment, an organic solvent, and optionally, a minor proportion (up to 10 wt. %) of water. The organic solvent is selected from alcohols, ketones, glycol ethers, and glycol ether esters. Alcohols and ketones are preferred.

Resins used in inks of the invention preferably have a glass-transition temperature greater than about 35° C. because the ink compositions do not require a crosslinker. The inks of the invention provide excellent adhesion and scratch-resistance properties compared with commonly used inks.

The invention includes a process for making a water-reducible resin. The process comprises polymerizing a vinyl aromatic monomer, a propoxylated allyl alcohol, and an acrylic acid monomer in the presence of a free-radical initiator and an amount of water effective to prevent the reaction mixture from gelling during the polymerization. The amount of water needed depends on many factors, including the reaction temperature, the particular monomers used, the resin molecular weight, and other considerations. Preferably, at least about 0.1 wt. % of water is used based on the amount of water-reducible resin made.

Previously, I described copolymers of vinyl aromatic monomers and propoxylated allyl alcohols. These copolymers are prepared at relatively high temperatures (preferably, about 130°–170° C.) because propoxylated allyl alcohol has relatively low reactivity toward free-radical polymerization. Unfortunately, such high temperatures are not suitable for copolymerizing propoxylated allyl alcohols and vinyl aromatic monomers in the presence of an acrylic acid monomer. Apparently, esterification reactions involving acrylic acid groups and hydroxyl groups from the propoxylated allyl alcohol become competitive with the desired free-radical polymerization. The result is an undesirable degree of crosslinking and a gelled reaction mixture. Even when gellation is avoided during the polymerization process, I found that it can cause problems following polymerization when unreacted monomers are stripped from the product under vacuum at high temperature.

I surprisingly found that satisfactory water-reducible resins comprising recurring units of a vinyl aromatic monomer, a propoxylated allyl alcohol, and an acrylic acid monomer can be successfully made even at the relatively high reaction temperatures required by performing the free-radical polymerization in the presence of water. The amount of water used is an amount needed to prevent the reaction mixture from gelling during polymerization. As Example 1 and Comparative Example 3 show, including water during the polymerization can be the difference between a successful resin synthesis and a gelled reaction mixture. I also found that gelling can occur following polymerization when unreacted monomers are stripped from the product under vacuum at elevated temperature. This gelling problem is overcome by stripping the unreacted monomers in the presence of water or steam.

Thus, in one process of the invention for making a water-reducible resin, a reactor is charged with a propoxylated allyl alcohol, 0 to 50% of the total amount to be used of a vinyl aromatic monomer, 0 to 50% of the total amount to be used of an acrylic acid monomer, and 0 to 90% of the total amount to be used of a free-radical initiator. The reaction mixture is heated in the presence of water at a temperature within the range of about 100° C. to about 200° C. The remaining vinyl aromatic monomer, acrylic acid monomer, and free-radical initiator are then gradually added to the reaction mixture to produce the water-reducible resin. Unreacted propoxylated allyl alcohol or other unreacted monomers are removed from the resin by water or steam-stripping under vacuum. The amount of water used in the process is an amount effective to prevent the reaction mixture from gelling during the polymerization or monomer removal steps.

Free-radical initiators useful in the process are those commonly used in the art for free-radical polymerizations. Preferred free-radical initiators are peroxide and azo compounds that have a relatively short half-life at the polymerization temperature selected. Preferably, the initiator half-life is within the range of about 30 seconds to about 30 minutes at the reaction temperature. Suitable free-radical initiators include, for example, AIBN, benzoyl peroxide, tert-butylperbenzoate, di-tert-butylperoxide, tert-butylhydroperoxide, and amyl hydroperoxide. Particularly preferred is an aqueous solution of tert-butyl-hydroperoxide such as T-HYDRO 70 solution, a 70% aqueous tert-butyl-hydroperoxide solution available from ARCO Chemical Company.

The process gives low molecular weight, crosslinkable resins without the need to include a solvent or a conventional chain-transfer agent (e.g., a mercaptan) in the polymerization. The propoxylated allyl alcohol monomer acts as a chain-transfer agent and modulates polymer molecular weight.

The water-reducible resins, neutralized resins, and derivatized resins of the invention are useful in a wide variety of applications. The water-borne coatings and inks, solvent-based coatings and inks, and powder coatings include melamines, polyurethanes, epoxies, alkyds, and polyesters. The resins are also valuable for concrete plasticizers, adhesives, wood finishes, industrial appliance coatings, automotive basecoats (as described, e.g., in U.S. Pat. No. 5,385,655, the teachings of which are incorporated herein by reference), and metal primers.

The following examples merely illustrate the invention. Those skilled in the art will recognize many variations that are within the spirit of the invention and scope of the claims.

EXAMPLE 1

Preparation of a Water-Reducible Resin

Propoxylated allyl alcohol (500 g, 1.0 oxypropylene unit per molecule) is charged to a one-liter stainless-steel reactor equipped with stirrer, steam heating jacket, temperture controller, nitrogen purge device, and addition pump. Tert-butyl hydroperoxide (T-HYDRO 70 solution, product of ARCO Chemical Company, 34 g), methacrylic acid (50 g), and styrene (200 g) are mixed and charged to the addition pump. After purging the reactor three times with nitrogen, the reactor is sealed, and the contents are heated to 145° C. The monomer mixture is added to the reactor over 5 h. The mixture is kept at 145° C. throughout the addition, and for an additional 0.5 h thereafter. Unreacted monomers are removed by vacuum distillation at 125° C., followed by steam stripping under vacuum, and the polymer product (338 g) is isolated.

Analysis of the product by $^{13}$C NMR spectroscopy indicates that the molar ratio of styrene: methacrylic acid: propoxylated allyl alcohol is 58.8: 26.8: 14.4. Gel permeation chromatography (GPC) analysis (polystyrene standards) shows Mn=1970; Mw=4850. Hydroxyl number: 143 mg KOH/g; acid number: 84 mg KOH/g. The resin shows excellent solubility in solvents most commonly used for coatings. Table 1 gives the solution viscosities of this resin in a variety of solvents at 50% and 70% solids.

EXAMPLE 2

Preparation of a Neutralized Resin

Propoxylated allyl alcohol (2000 g, 1.0 oxypropylene unit per molecule) is charged to a five-liter stainless-steel reactor equipped with stirrer, oil heating jacket, temperture controller, nitrogen purge device, vacuum distillation set up, and two addition pumps. Tert-butyl hydroperoxide (T-HYDRO 70 solution, 138 g) is charged to the initiator addition pump. A mixture of methacrylic acid (202 g), and styrene (809 g) is charged to the monomer addition pump. After purging the reactor three times with nitrogen, the reactor is sealed, and the contents are heated to 145° C. The tert-butyl hydroperoxide solution and monomer mixture are added simultaneously to the reactor over 6 h. The mixture is kept at 145° C. throughout the addition, and for an additional 0.5 h thereafter. Unreacted monomers are removed by vacuum distillation at 135° C., followed by steam stripping.

Aqueous ammonia solution (223 g of 19% $NH_3$ solution) is added to the reactor to neutralize the carboxylic acid groups of the resin. Excess ammonia is stripped out at 135° C. The neutralized resin (1222 g) is collected and analyzed. GPC analysis shows Mn=2770; Mw=10,390. Hydroxyl number: 136 mg KOH/g.

COMPARATIVE EXAMPLE 3

Attempted Preparation of a Water-Reducible Resin in the Absence of Water

The procedure of Example 1 is followed, except that di-tert-butyl peroxide is used instead of T-HYDRO 70 (aqueous tert-butyl hydroperoxide), and no water is included. The resulting resin contains 10 wt. % of gelled product that is insoluble in methanol. Because of the insoluble component, this resin is generally not suitable for use in making coatings.

EXAMPLE 4

Preparation of a Water-Borne Melamine Coating

The water-reducible resin of Example 1 (30 g) is mixed with distilled water (60 mL), triethylamine (4.6 g), and propylene glycol n-butyl ether (5.0 g). Mixing continues at 25° C. until a clear solution results, indicating that neutralization is complete. CYMEL 325 curative (10 g) and CYCAT 4040 catalyst (1.0 g) (products of Cytec) are added and mixed well. The coating solution is applied to aluminum panels, which are air dried in a hood for 30 min. at 25° C., and then baked at 150° C. for 30 min. The resulting coating is smooth, glossy, and has a nice appearance.

EXAMPLE 5

Preparation of a Solvent-Based Ink

The water-reducible resin of Example 1 (8.0 g) is mixed with R.S. ¼ sec nitrocellulose (8.0 g, product of Hercules), and the mixture is dissolved in a mixture of ethanol (22 g) and n-propyl acetate (30 g). Titanium dioxide pigment (20 g of R-900 pigment, product of DuPont) is dispersed in the solution. NEOREZ U-7611 polyurethane resin (8.0 g, product of Zeneca) and dioctyl phthalate (4.0 g) are added to the dispersion. The resulting ink is applied to a polypropylene film, and is dried at 25° C. Adhesion testing with 3M #600 SCOTCH tape gives a rating of 8 (10=no ink removed; 0=complete removal of ink by the tape). A control experiment with an ink prepared from a commercially available styrene-allyl alcohol copolymer instead of the water-reducible resin of the invention gives a rating of 6 in the same test.

EXAMPLE 6

Water-Borne Inks

A water-borne blue ink is prepared by mixing the water-reducible resin of Example 1 (30 g) with triethylamine (3.5 g), distilled water (50 g), methanol (50 g), and Water Blue dye (3.0 g, product of Morton International). A similar water-borne yellow ink is prepared by replacing the blue dye with Water Yellow dye (3.0 g, product of Morton International). The inks show excellent adhesion properties when applied to polypropylene film.

EXAMPLE 7

Solvent-based Inks

Solvent-based inks are prepared as described in Example 6, except that pure methanol, ethanol, or acetone (100 g) is used instead of the methanol/water (50/50) mixture. The inks show excellent adhesion properties when applied to polypropylene film.

TABLE 1

Solution Viscosities - Water-Reducible Resin of Example 1

| Solvent | Brookfield viscosity (cps, 50% solids) | Brookfield viscosity (cps, 70% solids) |
|---|---|---|
| ethyl acetate | 11.8 | 526 |
| butyl acetate | 21.6 | 1010 |
| methyl alcohol | 15.7 | 1620 |
| ethyl alcohol | 27.6 | 1570 |
| propylene glycol methyl ether | 65 | 3170 |
| propylene glycol n-propyl ether | — | 5100 |
| propylene glycol ethyl ether | 122 | 3470 |
| dipropylene glycol methyl ether | — | 4600 |
| ethylene glycol n-butyl ether | — | 4950 |
| propylene glycol n-butyl ether | 264 | 4110 |
| propylene glycol methyl ether acetate | 61 | 2780 |
| methyl amyl ketone | — | 854 |
| methyl isobutyl ketone | 7.9 | 840 |
| AROMATIC 150[1] solvent | 10.8 | 1260 |
| Xylenes | 24 | 1310 |

[1]Product of Exxon Chemical

I claim:

1. A water-reducible resin which comprises recurring units of:
    (a) from about 50 to about 90 wt. % of a vinyl aromatic monomer;
    (b) from about 5 to about 50 wt. % of a propoxylated allyl alcohol of the formula:

$CH_2=CR-CH_2-(A)_n-OH$ in which A is an oxypropylene group, R is hydrogen or a $C_1-C_4$ alkyl group, and n, which is the average number of oxypropylene groups in the propoxylated allyl alcohol, has a value within the range of about 1 to about 2; and
    (c) from about 1 to about 50 wt. % of an acrylic acid monomer;
    wherein the resin has a number average molecular weight within the range of about 500 to about 10,000, a hydroxyl number within the range of about 15 to about 250 mg KOH/g, and an acid number within the range of about 5 to about 330 mg KOH/g.

2. The resin of claim 1 wherein the vinyl aromatic monomer is selected from the group consisting of styrene, alkyl-substituted styrenes, α-substituted styrenes, halogenated styrenes, and mixtures thereof.

3. The resin of claim 1 wherein R is hydrogen, and n has a value of about 1.

4. The resin of claim 1 wherein the acrylic acid monomer is selected from the group consisting of acrylic acid and methacrylic acid.

5. The resin of claim 1 wherein the resin comprises from about 55 to about 70 wt. % of the vinyl aromatic monomer, from about 10 to about 40 wt. % of the propoxylated allyl alcohol, and from about 2 to about 10 wt. % of the acrylic acid monomer.

6. The resin of claim 1 having a glass-transition temperature of at least about 35° C.

7. A process for making a water-reducible resin, said process comprising polymerizing a vinyl aromatic monomer, a propoxylated allyl alcohol, and an acrylic acid monomer in the presence of a free-radical initiator and an amount of water effective to prevent the reaction mixture from gelling during the polymerization.

8. A process for making a water-reducible resin, said process comprising:

a) charging a reactor with a propoxylated allyl alcohol, 0 to 50% of the total amount to be used of a vinyl aromatic monomer, 0 to 50% of the total amount to be used of an acrylic acid monomer, and 0 to 90% of the total amount to be used of a free-radical initiator;

b) heating the reaction mixture in the presence of water at a temperature within the range of about 100° C. to about 200° C.;

c) gradually adding to the reaction mixture the remaining vinyl aromatic monomer, acrylic acid monomer, and free-radical initiator, to produce a water-reducible resin; and d) removing unreacted propoxylated allyl alcohol or other unreacted monomers from the resin by water or steam-stripping under vacuum;

wherein the water is used in an amount effective to prevent the reaction mixture from gelling during the polymerization or monomer removal steps.

* * * * *